H. STRATER.

DRAINER FOR DRAFT APPARATUS.

No. 11,371. Reissued Oct. 3, 1893.

WITNESSES

G. Henry Marsh.

Francis E. Sherwood

INVENTOR.

Herman Strater;

By H. S. Lodge

Att'y.

UNITED STATES PATENT OFFICE.

HERMAN STRATER, OF BOSTON, MASSACHUSETTS.

DRAINER FOR DRAFT APPARATUS.

SPECIFICATION forming part of Reissued Letters Patent No. 11,371, dated October 3, 1893.

Original No. 477,917, dated June 28, 1892. Application for reissue filed December 9, 1892. Serial No. 454,664.

*To all whom it may concern:*

Be it known that I, HERMAN STRATER, a citizen of the United States, residing at Boston, in the county of Suffolk and State of Massachusetts, have invented certain new and useful Improvements in Drainers for Draft Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to drainers for draft apparatus; and it consists in the peculiar construction and arrangement of the several parts whereby the entire structure is not only simplified, but with the same-sized drainer larger capacity is created and other advantages are secured.

Figure 1:
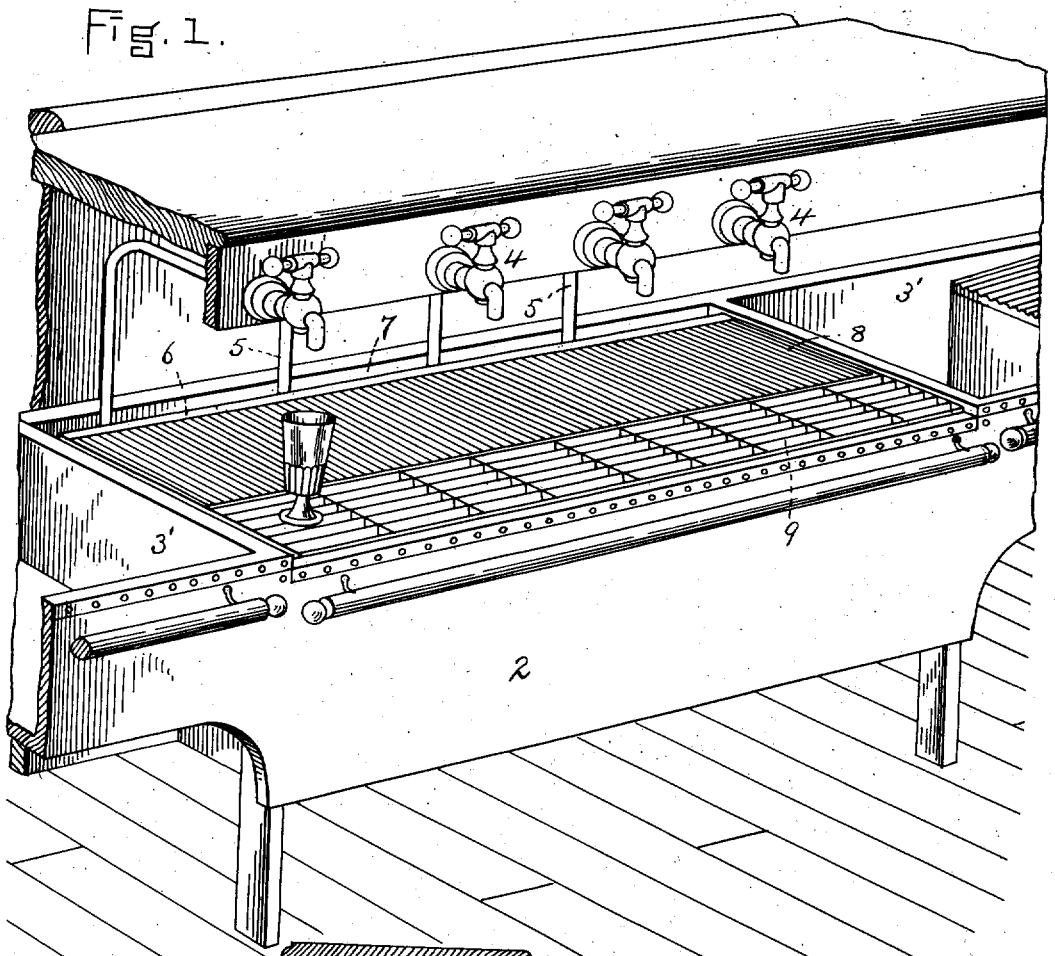
Figure 2:
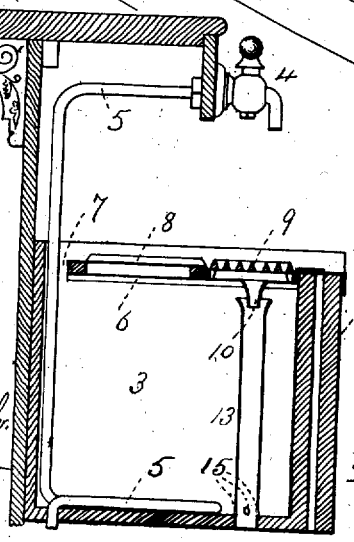
Figure 3:
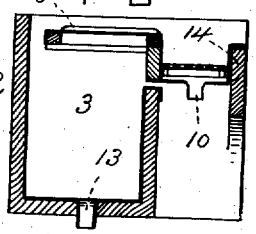

The drawings represent in Figure 1 a perspective view of a drainer embodying my improvements. Fig. 2 is a vertical cross-section of the same. Fig. 3 is a similar section of the old form for purposes of comparison. The heavy black lines indicate sheet metal.

Drainers of the class above premised, particularly beer on draft, contain certain prominent characteristics, primarily a rectangular oblong box 2, provided with a series of water-tight receptacles 3 3′, closed and open, respectively, arranged beneath the draft-faucets 4 4. The object of these drainers is to furnish a storage-shelf for the glasses, means for washing, rinsing and draining the same, also for the retention of the drip or overflow of the beverage, and, lastly, the cooling of the latter prior to its consumption. To carry out these several purposes, said drainers are fitted with the open receptacles 3′ 3′, in which the glasses are to be washed after use. The closed receptacles 3 serve as ice-chambers, which contain coils of pipe 5, one end of which enters the barrel or source of supply, while the other extremity terminates in the draft-faucets 4, preferably grouped in line above the drainer. Since said receptacles are to contain ice, they may be double-walled after the manner of refrigerators in general and, as shown in Fig. 2, on the front side of the drainer.

In connection with my improvements adapted to be embodied in the above arranged apparatus I have provided a removable drainer plate which serves as a cover for the ice-receptacles and consisting of an imperforate metallic sheet 6 which extends from the front rearward nearly to the back wall leaving a narrow opening 7 through which the pipes 5 pass in order that they may be connected with the draft-faucets.

A further feature consists in dividing the upper surface of the drainer plate into two portions a rear or drainer section 8, and a front or drip section 9. These two sections, drainer and drip, are created respectively by superimposing above the rear portion of the imperforate plate 6 a corrugated piece 8, removable or otherwise, upon which the glasses after being washed are set to drain and there remain in readiness for immediate use; while the drip portion consists of a slotted, or slatted piece preferably flush with the corrugated plate 8 and located above the front portion of the plate 6. In the present instance this drip surface is made up of a series of bars of inverted V shape in cross section. These bars are disposed preferably longitudinally of the apparatus and beneath the faucets 4 and are flush or in the same plane with the drainer surface. Since the plate 6 is imperforate, all liquid, either from the drainer surface or the drip surface, is received upon it and passed to a proper discharge, while to prevent such liquid from passing into the ice chamber, the corrugations in the plate 8 are preferably transversely of the drainer-plate proper and are intended to pitch forward slightly, so as to compel the drainage to enter the front part of the plate 6, whence it is conveyed away by means of a discharge consisting of a short pipe 10 with a funnel shaped mouth. Connecting with said pipe is the over-flow tube 13, which is rigidly positioned in the ice-chamber and is supplied with outlet openings 15 to permit the water from the melting ice to escape.

By the above-described arrangement the waste beverage or drip from the faucets and the water drainage from the washed glasses cannot have access to the ice-chamber, but is passed away through the tube 13, which serves as a common waste-pipe for both.

In order to show the more readily my improvements and the advantages obtained thereby, a cross-section of the old form of drainer is illustrated in Fig. 3. In such drainer the corrugated plate was made removable, while the front was a fixture, projected beyond the ice-chamber and was supported by a longitudinal bar 14. Furthermore, the drip-plate was made of a flat pan with a number of perforations; but owing to the construction and the spatter therefrom it was necessary that the top of said drip-plate should be considerably below the surface used for the drainage of the glasses. Another prominent feature consisted in having two waste-pipes, one for the ice-box, the other for the waste beverage and water from the glasses. Necessarily this pipe appeared in front. With my present improvements this is concealed, while the front wall of the drainer is a uniform plane surface in lieu of having a projecting bar 14 thereacross.

A further advantage from my improvements is that the ice-chamber is enlarged, while the entire drainer-plate composed of the imperforate cover 6, the drainer section 8 and the drip section 9, can be lifted off, allowing full access for filling with ice or for repairs. Conversely, in the old apparatus only the back part 8′ or corrugated portion is removable, and since the faucets project over the same the space by which the ice-chamber is replenished is necessarily very limited.

In lieu of making the corrugated portion 8 separate from but attached to the cover 6 the latter may be corrugated, in which event the upper piece 8 can be omitted.

From the above description it will be understood that my drainer plate which extends from the front to the rear of the apparatus, and is removable is made up of an imperforate plate and two other plates or pieces superimposed which respectively form a drainer and a drip surface in one and the same plane. By such arrangement the appearance of the apparatus is greatly improved while all spatter is prevented and access to the ice-chamber is more readily obtained while its capacity in the same apparatus provided with my invention is much enlarged.

What I claim is—

1. As a new article of manufacture, a drainer-box composed of a rectangular receptacle or ice-chamber adapted to receive coils of pipe and closed by a removable cover provided with transverse corrugations on the rear portion and with longitudinal drainage apertures in the front portion, and a single waste-pipe communicating with the ice-chamber and with the drainer-plate, substantially as described.

2. In combination with a group of open and closed water-tight receptacles and draft faucets thereabove from a suitable supply, a transversely corrugated plate lengthwise of the closed receptacles at the top rear portion, a series of drainer-plates composed of longitudinal bars with apertures therebetween and flush with the corrugated plate at the front portion of said closed receptacle, and means for discharging waste beverage and melted ice through a common pipe, substantially as stated and explained.

3. In a drainer, a group of open and closed vessels, conveying-pipes in part within the closed vessels, and the draft-faucets therefor, combined with a removable cover for the closed vessels, a transversely-corrugated plate secured on the rear part of said cover, and detachable drainer-plates raised above the front portion of said cover, with a waste pipe common to the drainer-plate and the closed receptacle, substantially as described and set forth.

4. In a draft apparatus, a drainer box provided with an ice chamber or receptacle adapted to receive coils of pipe through which the liquid to be drawn passes, said receptacle having a removable cover the rear part of the upper surface of which is corrugated, and the front portion of which is apertured to serve as a drainer, combined with a conduit to convey away the waste liquid from the drainer.

In testimony whereof I affix my signature in presence of two witnesses.

HERMAN STRATER.

Witnesses:

FRANCIS C. STANWOOD,

H. E. LODGE.